Sept. 22, 1942.  F. H. MUELLER ET AL  2,296,650
LUBRICATED VALVE
Filed Sept. 18, 1940
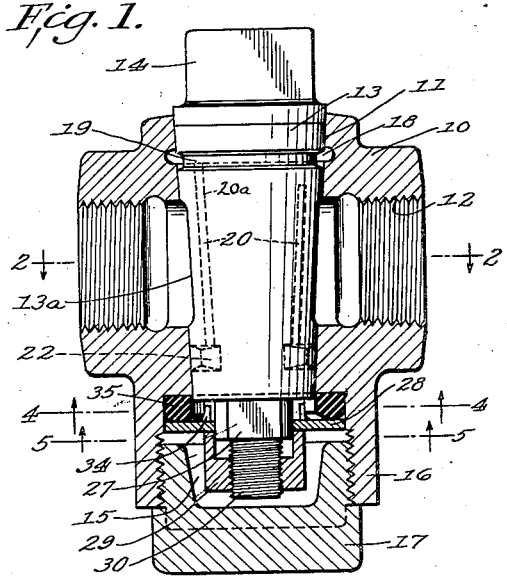
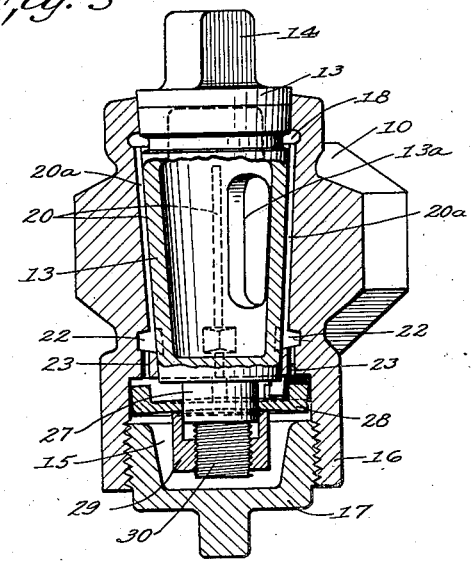
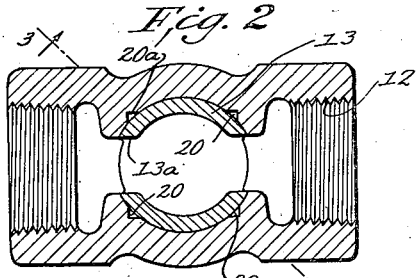
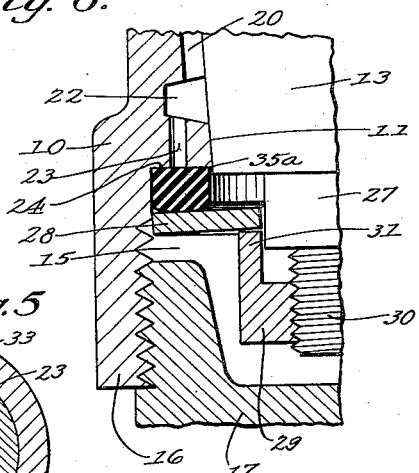
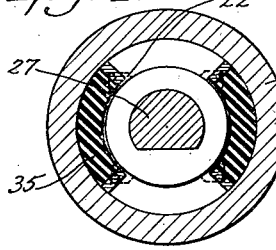
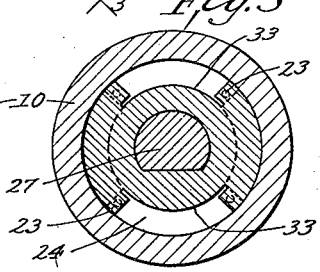
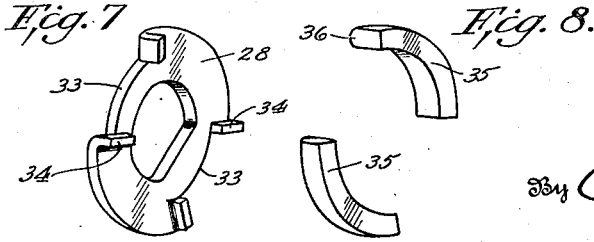
Inventor
Frank H. Mueller
Walter J. Bowan
By Cushman, Darby & Cushman
Attorneys Patented Sept. 22, 1942

2,296,650

UNITED STATES PATENT OFFICE 2,296,650

LUBRICATED VALVE

Frank H. Mueller and Walter J. Bowan, Decatur, Ill., assignor to Mueller Co., Decatur, Ill., a corporation of Illinois Application September 18, 1940, Serial No. 357,329

4 Claims. (Cl. 251—93)

The present invention relates to lubricated valves.

The principal objects of the invention are to provide a lubricated valve which will maintain lubricant under proper pressure and avoid escape of lubricant to the line during movement of the valve plug.

Other objects and advantages of the invention will be apparent from the following specification and drawing wherein:

Figure 1 is a longitudinal axial section through the valve.

Figure 2 is a transverse section on the line 2—2 of Figure 1.

Figure 3 is an axial section on the line 3—3 of Figure 2.

Figure 4 is a transverse section on the line 4—4 of Figure 1.

Figure 5 is a transverse section on the line 5—5 of Figure 1.

Figure 6 is an enlarged detail view, and

Figures 7 and 8 are perspective views of elements of a lubricant flow control provided in the valve.

Referring to the drawing, the numeral 10 designates the casing of the valve which is provided with a tapered seat 11 and a transversely arranged flow passageway 12. A tapered plug 13 having a flow port 13a is rotatable in the seat 11, plug 13 being provided at its enlarged end with an operating shank 14.

The enlarged end of the casing member seat 11 opens to the exterior of the casing but the reduced end opens to a lubricant chamber 15 provided on the casing member by a circumferential wall 16 which is threaded at its outer portion to receive a plug or closure 17 whereby the lubricant may be placed under pressure.

The seat 11 is provided adjacent its larger end with a circumferential groove 18 and the seating surface of the plug 13 which, with the seat 11, forms the seating surface of the valve, is provided with a circumferential groove 19 which is ordinarily positioned substantially opposite the groove 18. The seat 11 is also provided with four longitudinally extending grooves 20 of which two, diagonally opposite, terminate at points spaced from the circumferential groove 18, the opposite ends of these grooves terminating at a point spaced from the reduced end of the seating surface. The two diagonally opposite longitudinal grooves, designated specifically by the numeral 20a, extend from the circumferential groove 18 to a point spaced from the reduced end of the seating surface. Either diagonally opposite pair of longitudinally extending grooves may extend to the circumferential groove 18, but no adjacent pair of longitudinal grooves should extend into the circumferential groove.

In other words, the seating surface is provided with two grooves which are of a length only somewhat greater than the diameter of the flow passageway 12, while the remaining two grooves may extend to the circumferential groove 18, but all four grooves terminate at the same distance from the reduced end of the seating surface. The four grooves 20 are spaced substantially 90° apart, with two grooves on each side of the flow passageway 12 as indicated in Figure 2.

The ends of the grooves 20 adjacent the reduced end of the seat open to pockets 22 of somewhat greater depth radially of the valve than the the grooves and, as shown in Figure 6, these pockets have ports 23 extending from them, at a point spaced from the seat 11, to the inner wall 24 of chamber 15. It will be observed that the ports 23 open to the surface 24 at a point substantially spaced from the lower edge of the seating surface 11.

The surface 24 is preferably arranged at right angles or radially to the axis of the valve and is of such substantial width that a fairly broad surface is present in both radial directions from the ports 23.

In order to control the flow of lubricant from the chamber 15 through the ports 23, the shank 27 of the plug has keyed thereto a metal washer 28 of relatively rigid metal but having some degree of resiliency. The washer is held in position on the shank by means of a nut 29 which is threaded upon a reduced extension 30, the extreme inner or central portion of the washer resting upon the inner and reduced edge 31 of the nut. Thus the major width of the washer 28 is free of the nut 29 so as to provide an adequate space for lubricant within the chamber 15 and also to obtain the benefit of the resiliency of the washer 28.

Referring to Figure 7, the washer or carrier 28 is of substantially the same form as disclosed in our application for Lubricated valve, Serial No. 312,788, filed January 6, 1940, and includes a flat body portion with diametrically opposite arcuate cut-outs 33, the edges abutting the cut-outs being up-turned to provide ears 34. The solid portions of the washer 28 which alternate with the cut-out portions bear resilient strips 35 of arcuate form, the strips being of such length that their ends will contact with the ears 34. As best shown in Figure 6, the surface 36 of each strip 35 which bears upon the washer 28 is rounded or curved in transverse or radial section while the opposite face of the strip, which bears against the shoulder 24, is flat so that it will lie flat on the shoulder. The strips 35 may be either of resilient material having sufficient rigidity that their surfaces in contact with the washer 28 will not be so compacted under pressure as to lie entirely flat upon the washer, or they may be of metal.

Because of the fact that the surfaces of the strips 35 are rounded in radial section as described above, when the nut 29 is so tightly threaded upon the valve plug as to compress the inner portion of washer or carrier 28 and bend the same to a dished form as indicated in Figure 6, the outer portions of the washer may rock about the strips 35, leaving the opposite surface of the strips entirely flat upon the surface 24. This arrangement is highly desirable in installations where high pressures are encountered because the strips 35 must be held closely in contact with the surface 24 in order to resist pressure. Unless the washer 28 can rock with respect to the strips 35, the bending of the washer indicated in Figure 6 will cause the strips to move bodily with the washer with the result that only their inner edges indicated at 35a in Figure 6 would have a firm contact with the surface 24. If the strips are in this position under high pressure, there could be loss of lubricant from the chamber 15 to the flow passageway 12 during turning movement of the plug as hereinafter described.

As best illustrated in Figure 5, the cut-out portions 33 of the washer or plate 28 are of such length that the ears 34 which extend toward the surface 24 will be in alignment with the ports 23 during opened and closed position of the plug. That is, the strips 35 will terminate immediately adjacent the ports 23 and will bear on the portion of the surface 24 between these ports but because the ears are of less axial depth than the strips 35 the ears will not contact with the surface 24 and hence will leave the ports uncovered.

During the operation of the valve, if the plug is rotated from opened to closed position in the direction of the arrow in Figure 5, for example, two of the ports 23 will immediately be closed by the movement of the leading edges of the strips 35 beneath the same, thereby entirely cutting off these ports and the associated grooves 20 from communication with the lubricant chamber 15. The two ports thus closed are those which communicate with the grooves 20 across which the flow port 13a will move during turning movement of the plug. It will be obvious that at one point during such turning movement the flow port 13a will place two diametrically opposite grooves 20 in communication with the flow passageway 12.

The movement of the plug 13 is preferably so limited and the extended longitudinal port 20a is so positioned that the flow port 13a of the plug will not move across the groove 20a during rotation of the plug. The provision of the extended groove 20a assures that an adequate seal will be provided by lubricant in the circumferential grooves 18 and 19 in high pressure installations.

It will be understood that in some installations it may not be necessary to provide the ports 23 but that the grooves 20 may extend directly to the surface 24 for control by the strips 35.

The terminology used in the specification is for the purpose of description and not of limitation, the scope of the invention being indicated in the claims.

We claim:

1. In a valve structure, a valve casing provided with a seat and a transversely arranged flow passageway, a valve rotatable in the seat and provided with a radial flow passage, lubricant grooves in the seating surface of the valve structure, a lubricant chamber in the casing member, ports between the chamber and lubricant grooves, a carrier in the lubricant chamber urged toward the ports, and port controlling members mounted on the carrier, said members having a curved face bearing on the carrier to have rocking engagement with respect to the latter and a flat face opposite the ports to bear upon the latter.

2. In a valve structure, a valve casing provided with a seat and a transversely arranged flow passageway, a valve rotatable in the seat and provided with a radial flow passage, lubricant grooves in the seating surface of the valve structure, a lubricant chamber in the casing member, ports between the chamber and lubricant grooves, a carrier in the lubricant chamber urged toward the ports, and resilient port controlling members of arcuate form mounted on the carrier, said members having rocking engagement with respect to the carrier and a flat face opposite the ports to bear on the latter.

3. In a valve structure, a valve casing provided with a seat and a transversely arranged flow passageway, a valve body rotatable in the seat and provided with a radial flow passage, lubricant grooves in the seating surface of the valve structure, a lubricant chamber in the casing member, ports between the chamber and lubricant grooves, a substantially flat carrier in the lubricant chamber coaxial with the valve body, means on the valve body to engage the carrier at its central portion to urge it toward the ports, resilient members of arcuate form mounted at the outer portions of the carrier, said resilient members having curved faces bearing on the carrier to have rocking engagement with respect to the latter and a flat face opposite the ports to bear on the latter.

4. In a valve structure, a valve casing provided with a seat and a transversely arranged flow passageway, a valve rotatable in the seat and provided with a radial flow passage, a lubricant groove in the seating surface of the valve structure, a lubricant chamber to which the groove opens, a carrier member in the lubricant chamber urged toward the mouth of the groove, and a flow controlling member mounted on the carrier, the contacting faces of one of said members being curved and the adjacent face of the opposed member being flat so that said flow controlling member will fully bear against the mouth of the groove independently of the angle of the carrier with respect to the groove.

FRANK H. MUELLER.
WALTER J. BOWAN.